No. 659,215. Patented Oct. 9, 1900.
J. L. DOELP.
NUT LOCK.
(Application filed July 2, 1900.)
(No Model.)

Witnesses:
Sidney P. Hollingsworth
E. A. Bulloch

Inventor:
John L. Doelp
by his attorneys
Brewson Dainton Wight

THE NORRIS PETERS CO., PHOTO-LITHO., WASHINGTON, D. C.

UNITED STATES PATENT OFFICE.

JOHN L. DOELP, OF NEW MARTINSVILLE, WEST VIRGINIA.

NUT-LOCK.

SPECIFICATION forming part of Letters Patent No. 659,215, dated October 9, 1900.

Application filed July 2, 1900. Serial No. 22,291. (No model.)

*To all whom it may concern:*

Be it known that I, JOHN L. DOELP, a citizen of the United States, residing at New Martinsville, in the county of Wetzel and State of West Virginia, have invented certain new and useful Improvements in Nut-Locks, of which the following is a specification.

This invention relates to that class of nut-locks in which the nut is provided with a split sleeve that receives a clamping-ring which compresses the sleeve, causing it to bind on the bolt, and thus prevent the nut from working loose.

The object of my invention is to so construct a nut-lock of this class that it may be formed of few parts, all of which are strong and durable, readily operated to lock or unlock the nut, secure when adjusted to the locked position, and not liable to become detached from each other.

In carrying out my invention I employ a bolt of any usual construction, one of the merits of my invention being that no special construction of bolt is required. The nut is formed with a split sleeve projecting from one of its sides, and this sleeve is formed on its periphery with a cam-surface, with which engages a corresponding cam-surface on the inside of a ring which surrounds the sleeve. When the ring is turned to one position, it does not act to compress the sleeve; but when turned to another position it causes the sleeve to be compressed, and thus grip the bolt, preventing the nut from turning in either direction. The sleeve is formed with a stop or stops, preferably in the form of a flange, on its periphery at its outer end, which prevents the ring from slipping off when loose. The nut and its locking devices are all made from only two pieces of metal.

Figure 1:
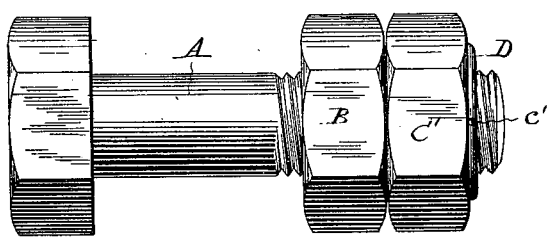
Figure 2:
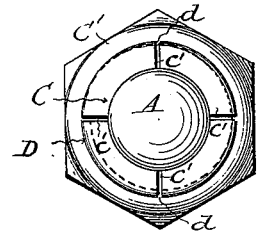
Figure 3:
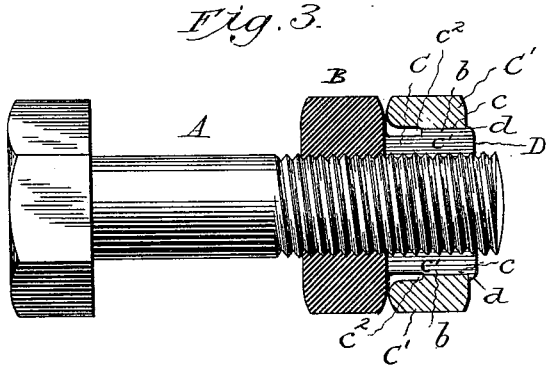
Figure 4:
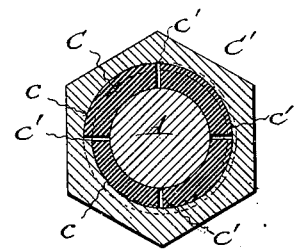
Figure 6:
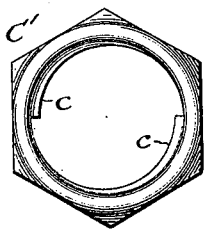
Figure 5:
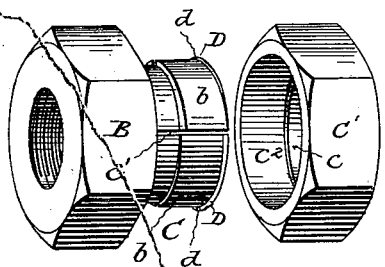

In the accompanying drawings, Figure 1 shows a side elevation of a bolt and nut with my improvements applied. Fig. 2 shows an end view thereof. Fig. 3 shows a side elevation of a bolt and a section of the nut, with its locking devices applied to the bolt. Fig. 4 shows a transverse section through the nut-locking devices. Fig. 5 shows a perspective view of the nut and its locking devices. Fig. 6 is an end view of a modified form of locking-ring which may be employed.

The bolt A, it will be observed, is of ordinary form. Its screw-threaded portion may be straight or tapered, but is preferably made straight, as shown. My improvements do not depend on any special construction of bolt, but may be readily applied to any bolt. The nut B is formed with a sleeve C, which projects from one face and is threaded on its inner surface similarly to the nut. On its periphery the sleeve is formed with a spiral or cam surface $b$—*i. e.*, a surface of gradually-increasing radius—to operate in connection with a corresponding surface $c$ on the interior of a ring C', which surrounds the sleeve at its outer end. The sleeve is split, so that it may be collapsed and grip the bolt when the ring is turned to one position and to expand when the ring is turned to another position. In the drawings the sleeve is shown as being split or slotted at four places $c'$; but a less or greater number of slits may be employed. In order to prevent the ring from slipping off endwise when loose on the sleeve, I provide a stop D, which projects from the sleeve across the end of the ring. I have shown this stop as being in the form of a flange formed integrally with the sleeve and extending entirely around it, being interrupted only by the slots $d$, formed in it, which are in line with and form continuations of the slits $c'$; but the flange or stop may be of smaller dimensions and yet perform the same office. At its outer end the ring is formed with a recess $c^2$, having tapered walls adapted to engage the flange D when assembling the parts and to cause the sleeve to be compressed when the ring is driven endwise onto the sleeve.

Fig. 5 indicates the manner in which the ring is applied to the sleeve. The sleeve is shown as being expanded; but when the tapered walls engage the flange and the ring is driven toward the nut B the sleeve will be compressed to such an extent that the ring may pass entirely over the flange, after which the sections of the sleeve expand and the flange will assume the position shown in Fig. 3, at which time the ring is free to turn on the sleeve, but is prevented from endwise movement thereon.

In Fig. 4 I have shown the sleeve as formed with one continuous spiral cam of gradually-increasing radius from end to end; but two or more spiral cams may be employed, as indicated in Fig. 6. It will thus be understood that the ring is applied to the sleeve before the nut is applied to the bolt, and when in use the nut carries the sleeve with it until the proper adjustment is attained. Then the ring D may be turned in such manner as to compress the sleeve and cause it to grip tightly the bolt, thus securely locking the nut in place.

It will be observed that the nut B and the ring D are of practically the same shape, and the same wrench or tool may be used for turning the ring as is used for turning the nut. While the ring securely locks the nut in place when desired, it may also be readily turned to cause the sleeve to release its grip on the bolt, and then the nut may be withdrawn. It will therefore be seen that a secure locking device is obtained without mutilating any of its parts.

I claim as my invention—

1. The combination of a nut formed with a split sleeve having a cam-surface on its periphery, and a ring surrounding the sleeve formed on its interior, with a corresponding cam-surface engaging that on the sleeve.

2. The combination of a nut formed with a split sleeve having a cam-surface on its periphery, a ring surrounding the sleeve formed on its interior, with a corresponding cam-surface engaging that on the sleeve, and a stop on the sleeve for preventing endwise movement of the ring.

3. The combination of a nut provided with a split sleeve having a cam-surface on its periphery, and a flange projecting from its periphery at one end and a ring surrounding the sleeve inside the flange and having a cam-surface engaging the cam-surface on the sleeve.

4. The combination of a nut provided with a split sleeve having a stop-flange on its periphery at one end, a nut encircling the sleeve having a cam-surface on its interior engaging the cam-surface on the sleeve and having also a recess at one end with tapered walls, for the purpose specified.

In testimony whereof I have hereunto subscribed my name.

JOHN L. DOELP.

Witnesses:
GEORGE RANKIN,
C. M. SHAW.